United States Patent [19]  
Carding et al.

[11] 3,887,689  
[45] June 3, 1975

[54] CARBONATION OF AMMONIACAL SODIUM CHLORIDE BRINE

[75] Inventors: John Raymond Carding; Cyril Peover, both of Runcorn, England

[73] Assignee: Imperial Chemical Industries Limited, London, England

[22] Filed: Mar. 26, 1973

[21] Appl. No.: 344,599

[30] Foreign Application Priority Data  
Mar. 27, 1972 United Kingdom............... 14250/72

[52] U.S. Cl.................................. 423/423; 423/190
[51] Int. Cl................................................ C01d 7/1
[58] Field of Search .......... 423/420, 421, 422, 423, 423/424

[56] References Cited  
UNITED STATES PATENTS  
1,766,705  6/1930  Dehnel............................. 423/420

2,027,982  1/1936  Johnstone........................... 423/531
2,671,713  3/1954  Miller et al. ........................ 423/423
3,036,882  3/1962  Bemmann et al.................... 423/422

FOREIGN PATENTS OR APPLICATIONS  
8,763   7/1915   United Kingdom................ 423/420
17,657  12/1887  United Kingdom................ 423/421

Primary Examiner—Oscar R. Vertiz  
Assistant Examiner—Gary P. Straub  
Attorney, Agent, or Firm—Cushman, Darby & Cushman

[57] ABSTRACT

Carbonation of ammoniacal sodium chloride brine in the ammonia soda process wherein a phenol-free or phenol deficient ammonia is used as make-up ammonia, the improvement being that one or more phenolic compounds are added to the process in an amount sufficient to reduce the carbon dioxide content of waste gas leaving the carbonation stage to less than 12 percent carbon dioxide.

8 Claims, No Drawings

CARBONATION OF AMMONIACAL SODIUM CHLORIDE BRINE

The present invention relates to the carbonation of an ammoniacal sodium chloride brine in an ammonia soda process.

In the carbonation stage of the ammonia soda process, an aqueous solution of sodium chloride containing ammonia (so-called 'ammoniacal sodium chloride brine') is reacted with gaseous carbon dioxide in Solvay-type towers to precipitate sodium bicarbonate in a liquor comprising ammonium chloride (in an amount equivalent to the sodium bicarbonate produced), sodium chloride carbon dioxide and ammonia in aqueous solutions.

By the term 'ammoniacal sodium chloride brine' we also include liquor which is partially carbonated.

The sodium bicarbonate is then removed by filtration and the liquor is heated with steam and lime to regenerate ammonia, which may then be re-used in the preparation of further ammoniacal brine. In practice, theoretical recovery of ammonia is not achieved, and it is necessary to counteract these losses by introducing make-up ammonia at some convenient point in the process. It has been customary for many years for some ammonia soda manufacturers to add the make-up ammonia in the form of concentrated ammonia liquor (so-called 'crude liquor') obtained as a by-product in the carbonisation of coal in either gas works or coke ovens. Crude liquor has certain disadvantages, however, in that it contains organic impurities which can give rise to discolouration of the sodium carbonate produced in the end product in the ammonia soda process, and these organic impurities can also give rise to contamination of effluents. Moreover, the availability of crude liquor has decreased in recent years owing to the increasing use of natural gas. Accordingly, there has been an increasing tendency amongst these ammonia soda manufacturers to use synthetic liquefied ammonia instead of crude liquor as the source of make-up ammonia.

The use of synthetic ammonia as a major part of the make-up ammonia, or as a complete replacement of crude liquor, is not entirely satisfactory. In particular, it has been observed to result in a reduction in the liquor level in the carbonating towers and in the efficiency of absorption of carbon dioxide, which in turn causes the waste gas leaving the top of the towers to have an undesirably high carbon dioxide content (e.g. 12–16 percent instead of 4–8 percent). Since the waste gas is normally discharged to atmosphere, this increased loss of carbon dioxide results in increased costs associated with the compression of the carbon dioxide fed to the bottom of the carbonating towers and the additional lime which must be burnt to provide the required extra carbon dioxide. Alternatively, it has been found necessary to instal additional equipment to absorb some of the excess carbon dioxide (e.g. in ammoniacal brine) and thereby recycle it to the carbonation stage.

It has also been observed that some crude liquors are not as effective as others in promoting good absorption of carbon dioxide in the towers.

We have now found that the disadvantageous effect on liquor levels and on carbon dioxide absorption efficiency in the carbonating towers resulting from an increased use of synthetic ammonia or from using certain crude liquors may be overcome by deliberately adding one or more phenolic compounds.

According to the present invention there is provided a method of carbonating ammoniacal sodium chloride brine in an ammonia soda process wherein a phenol-free or phenol deficient ammonia is used as the make-up ammonia characterised in that one or more phenolic compounds are added to the process in an amount sufficient to reduce the carbon dioxide content of the waste gas leaving the carbonation stage to less than 12 percent by volume carbon dioxide.

By the term 'phenol deficient' we mean either that there are insufficient phenolic compounds present in the make-up ammonia to reduce the carbon dioxide content of waste gas to the desired level, or that the phenolic compounds are ineffective in producing the desired reduction in carbon dioxide content, e.g. because of the presence of other substances in the make-up ammonia which counteract the effect of the phenolic compounds. In either case, it will be necessary to add further phenolic compounds to produce the desired reduction in carbon dioxide content.

A wide variety of phenolic compounds may be used, but it is preferred to use phenolic compounds which are capable of being volatilised by steam e.g. in the distillation stage of the ammonia soda process. It is also preferred to use phenolic compounds which are stable throughout the various stages of the ammonia soda cycle (absorption, carbonation, distillation), so that the phenolic compounds may be recovered and used again (with a small make-up as required) in the carbonation stage.

Suitable phenolic compounds include phenol itself; alkyl-substituted phenols, e.g. cresols, xylenols, thymol and ethyl phenols; chlorophenols; fused ring phenols e.g. naphthols, phenanthrols and anthranols; and polyhydric phenols e.g. catechol, resorcinol, hydroquinone, pyrogallol, hydroxyhydroquinone, phloroglucinol, benzenetetrols and benzenehexol. It is especially preferred to add cresols (ortho, meta and para) as the phenolic compounds.

When synthetic ammonia is used as the sole source of make-up ammonia, the required carbon dioxide test is achieved by adding sufficient phenolic compound to maintain at least 10 milligrams of phenolic compound per litre of ammoniacal sodium chloride brine entering the carbonating towers. The amount of phenolic compound is preferably in the range 10–250 milligrams per litre of ammoniacal sodium chloride brine, and especially in the range 20–100 milligrams of phenolic compound per litre of ammoniacal brine. The amount of phenolic compound added is preferably monitored according to the concentration of phenolic compounds in the liquor entering the carbonating towers, although the parameter of carbon dioxide level in waste gas or liquor height could be used if desired.

When crude liquor is used as the sole source of make-up ammonia, or when a mixture of crude liquor and synthetic ammonia is used as the make-up ammonia, the amount of phenolic compound to be added will depend on the extent to which the carbon dioxide test of waste gas is in excess of the desired value, and can be determined by adding a definite amount and observing the effect on liquor height in the tower and/or on the carbon dioxide level of the waste gas.

The amount of phenolic compound required is dependent on the nature of the crude liquor and the relative proportions of crude liquor and synthetic ammonia. It is believed that the effectiveness of crude liquor in reducing the carbon dioxide content of waste gas varies not only according to the phenolic compound content of the crude liquor being used, but also according to the amount of certain additional compounds which may be present e.g. long-chain fatty alcohols, which have a counteracting effect on the phenolic compounds. In general, however, it is found that when using crude liquor, either alone or admixed with synthetic liquor, a beneficial effect is achieved by adding 20-150 milligrams of phenolic compounds per litre of ammoniacal brine.

Phenolic compounds can be added as pure reagents or as a mixture of phenols, for example as obtained from the fractional distillation of coal tar products. The phenolic compounds can also be added as crude liquor.

The phenolic compound may be added at any convenient point in the ammonia soda process, but it is preferred to add it to ammoniacal sodium chloride brine resulting from the ammonia absorption stage and prior to the preliminary carbonation stage (in which no sodium bicarbonate is precipitated). In practice, the majority of the phenolic compound present in the liquor being fed to the carbonating towers is regenerated during the distillation stage and is recycled along with regenerated ammonia to be re-absorbed in the brine. It is therefore only necessary to provide a make-up of phenolic compound to achieve the desired effect of reducing the waste gas test to less than 12% carbon dioxide.

It is believed that the effectiveness of the phenolic compounds in reducing the carbon dioxide level in waste gas arises because the phenolic compounds cause a reduction in bubble size of carbon dioxide, thereby increasing the area of contact between the gas and liquor with consequent increased absorption efficiency. It is believed that the beneficial effect of adding phenolic compounds may be applicable in other gas absorption systems.

The invention is illustrated but not limited by the following Examples:

EXAMPLE 1

In an ammonia soda process, in which the make-up ammonia was synthetic ammonia, a carbonating tower (diameter 9ft., height 90ft.) was operating continuously with a liquor height of 70ft. and a waste gas test of 12-16 percent carbon dioxide.

A mixture of cresols, containing 40-42 percent by weight of meta-cresol and 34-36 percent by weight of para-cresol, marketed as cresylic acid, was added to the ammoniacal sodium chloride brine at a rate equivalent to 20 milligrams of cresols per litre of the liquor entering the carbonating tower. The liquor height increased to 73-81 ft. and the waste gas test reduced to 4-8 percent carbon dioxide. Addition was continued at a reduced rate for a further 4 days, whilst still maintaining the concentration of cresols at 20 milligrams per litre. The increased liquor height and reduced waste gas test were maintained.

EXAMPLE 2

Example 1 was repeated using ortho-cresol as a replacement for cresylic acid. Since ortho-cresol has a melting point of 30°C it was necessary to dilute it with 10 percent w/w water to reduce the melting point to 10°C. It was this diluted form that was added to the ammoniacal sodium chloride brine. The ortho-cresol was added at the same rate as cresylic acid in Example 1 to begin with and the waste gas test reduced to 7-9 percent carbon dioxide. To maintain the carbon dioxide in the waste gas at 7-9 percent required a level of 80-100 ppm ortho-cresol in the feed liquor.

EXAMPLES 3-14

Laboratory tests were conducted using phenolic additives as listed in the Table I below. In each case an increase in liquor height of a laboratory carbonated vat liquor column was observed.

Table 1

| | | Concentration of additive (ppm) | 25 | 50 | 75 | 120 |
|---|---|---|---|---|---|---|
| Ex | Phenolic Compound | Physical State of additive at ambient temp. | \multicolumn{4}{c}{Increase in height of liquor in column from 24"} | | | |
| 3 | Resorcinol | liquid | 13" | | | |
| 4 | 4-methyl catechol | solid | 2½ | 4-4½ | 9½-10½ | |
| 5 | 3,4-xylenol | solid | 3½-4 | 3½-4 | 3½-4 | |
| 6 | p-cresol | solid | 1-1½ | 2-2½ | 4-4½ | 4-4½ |
| 7 | 2,4,5-trichloro-phenol | solid | 1 | 2 | 3½ | 5 |
| 8 | p-chlorophenol | solid | 1-1½ | 2-2½ | 3 | 3½-4 |
| 9 | 2,4,6-trichloro-phenol | solid | ½-1 | 2 | 3 | 4 |
| 10 | 2,4-dichloro-phenol | solid | ½ | 1 | 1½-2 | 2½ |
| 11 | m-cresol | liquid | ½ | 1 | 1½ | 2 |
| 12 | catechol | solid | 0 | 0 | ½ | 1 |
| 13 | Phenol | solid | ½ | ½ | ½-1 | ½-1 |
| 14 | 2,4 xylenol | solid | ½ | 0-½ | 0-½ | 0-½ |

What we claim is:

1. In a method of carbonating ammoniacal sodium chloride brine in an ammonia soda-Solvay process wherein a phenol-free or phenol-deficient ammonia is used and the phenolic compound content of the brine is below 10 milligrams per litre of ammoniacal sodium chloride brine and the carbon dioxide content of waste gas is above 12% by volume, the improvement comprising adding a sufficient amount of one or more phenolic compounds to the process to increase the phenolic compounds content of the brine to between 10 and 250 milligrams per litre and to reduce the carbon dioxide content of the waste gas to less than 12% by volume.

2. A method as claimed in claim 1 wherein the phenolic compound is capable of being volatilized by steam generated in the distillation stage of the ammonia soda process.

3. A method as claimed in claim 1 wherein the phenolic compound is phenol, an alkyl-substituted phenol, a chlorophenol, a fused ring phenol or a polyhydric phenol.

4. A method as claimed in claim 3 wherein the phenolic compound is a cresol, a xylenol, thymol, an ethyl phenol, a naphthol, a phenanthrol, an anthranol, catechol, resorcinol, hydroquinone, pyrogallol, hydroxy hydroquinone, phloroglucinol, a benzenetetrol or benzenehexol.

5. A method as claimed in claim 1 wherein synthetic ammonia is used as the sole source of make-up ammonia.

6. A method as claimed in claim 5 wherein the amount of phenolic compound is in the range 20–100 milligrams per litre of ammoniacal sodium chloride brine.

7. A method as claimed in claim 1 wherein a mixture of crude liquor and synthetic ammonia is used as the source of make-up ammonia.

8. A method as claimed in claim 7 wherein the amount of phenolic compound added is 20–150 milligrams per litre of ammoniacal sodium chloride brine.

* * * * *